(No Model.) 6 Sheets—Sheet 3.

C. T. WORDSWORTH, E. WISEMAN & J. HOLROYD.
MOTOR WORKED BY HYDROCARBON OR OTHER GASES.

No. 589,108. Patented Aug. 31, 1897.

(No Model.) 6 Sheets—Sheet 4.
C. T. WORDSWORTH, E. WISEMAN & J. HOLROYD.
MOTOR WORKED BY HYDROCARBON OR OTHER GASES.
No. 589,108. Patented Aug. 31, 1897.
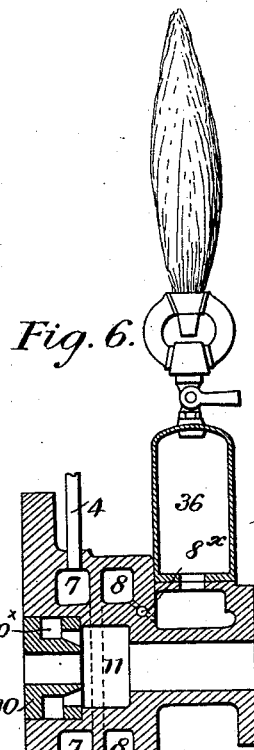
Fig. 6.
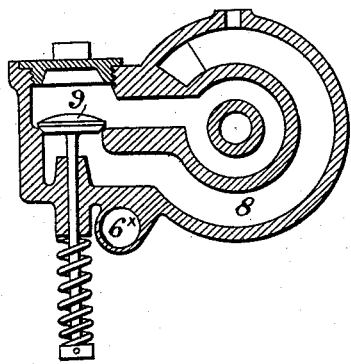
Fig. 5.
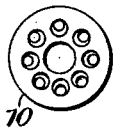
Fig. 5.ˣ
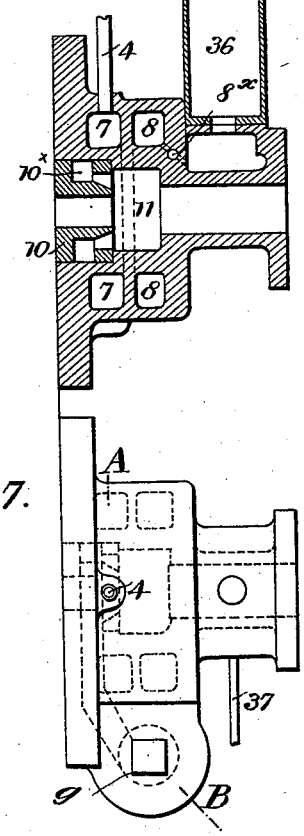
Fig. 7.
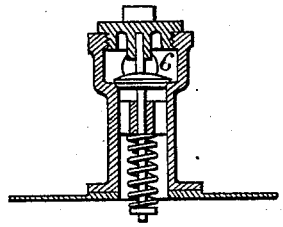
Fig. 8.
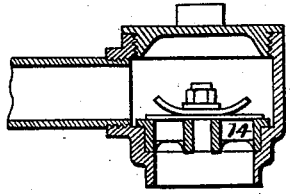
Fig. 9.
Witnesses
E. A. Pelloch
B. W. Miller
Inventors
C. T. Wordsworth
E. Wiseman
J. Holroyd
By their Attorneys
Baldwin, Davidson & Wight (No Model.) 6 Sheets—Sheet 5.
C. T. WORDSWORTH, E. WISEMAN & J. HOLROYD.
MOTOR WORKED BY HYDROCARBON OR OTHER GASES.
No. 589,108. Patented Aug. 31, 1897.

United States Patent Office.

CHRISTOPHER THOMAS WORDSWORTH, OF MANCHESTER, EDMUND WISEMAN, OF LUTON, AND JOHN HOLROYD, OF LONDON, ENGLAND.

MOTOR WORKED BY HYDROCARBON OR OTHER GASES.

SPECIFICATION forming part of Letters Patent No. 589,108, dated August 31, 1897.

Application filed November 23, 1896. Serial No. 613,176. (No model.)

*To all whom it may concern:*

Be it known that we, CHRISTOPHER THOMAS WORDSWORTH, residing at 4 Corporation Street, Manchester, in the county of Lancaster, EDMUND WISEMAN, residing at Cheapside, Luton, in the county of Bedford, and JOHN HOLROYD, residing at 13 Alleyn Terrace, Park Road, West Dulwich, London, in the county of Surrey, England, engineers, subjects of the Queen of Great Britain, have invented certain new and useful Improvements in Motors Worked by Hydrocarbon or other Gases, of which the following is a specification.

This invention relates especially to motors to be worked by the combustion within them of the vapor of a hydrocarbon liquid, such as petroleum, and to means for controlling the transmission of power developed by such motor. The subject-matter deemed novel is hereinafter claimed.

Figure 1:
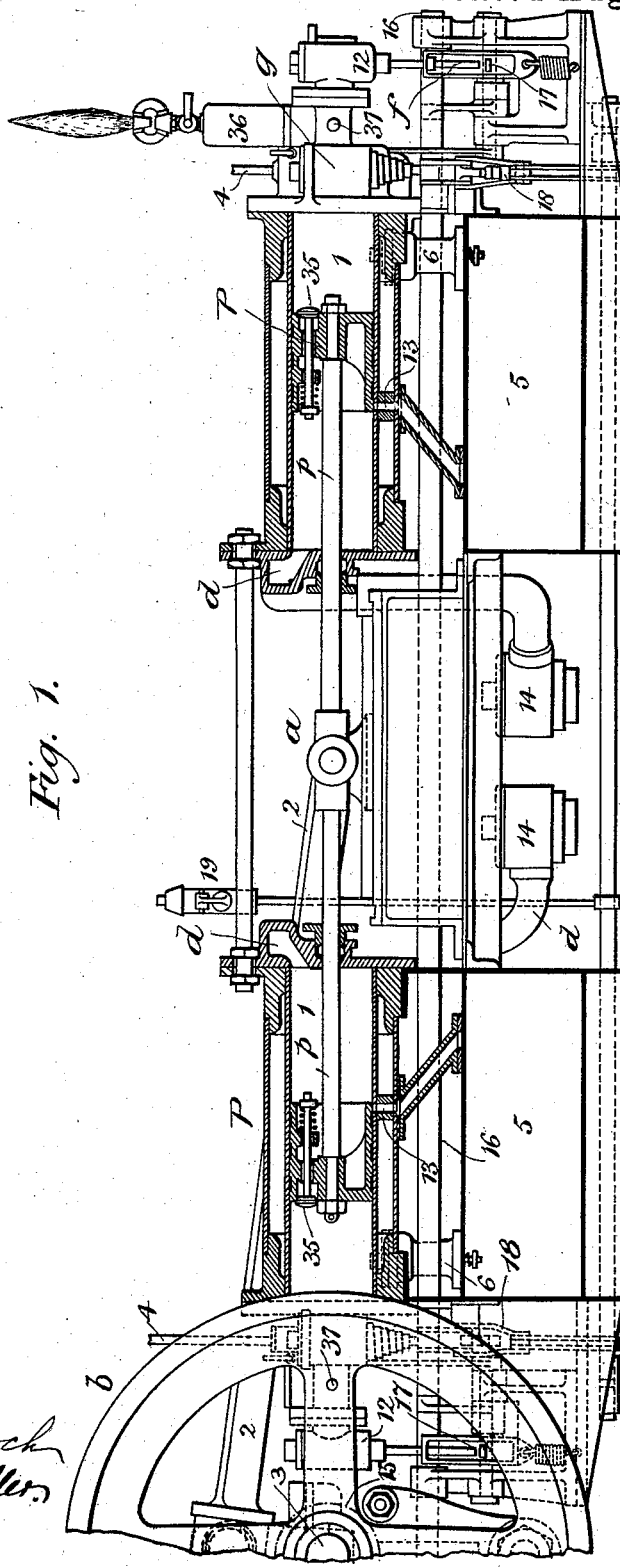
Figure 2:
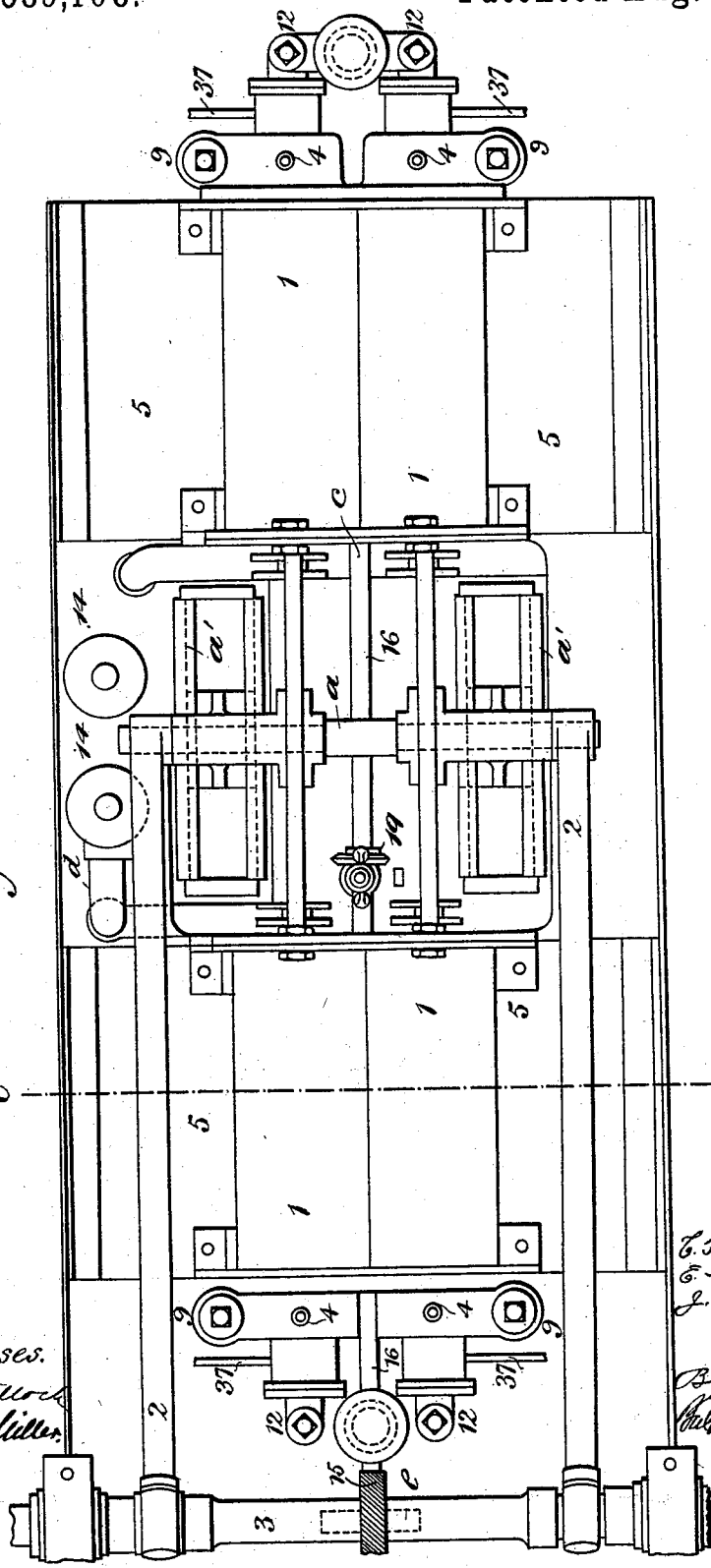
Figure 3:
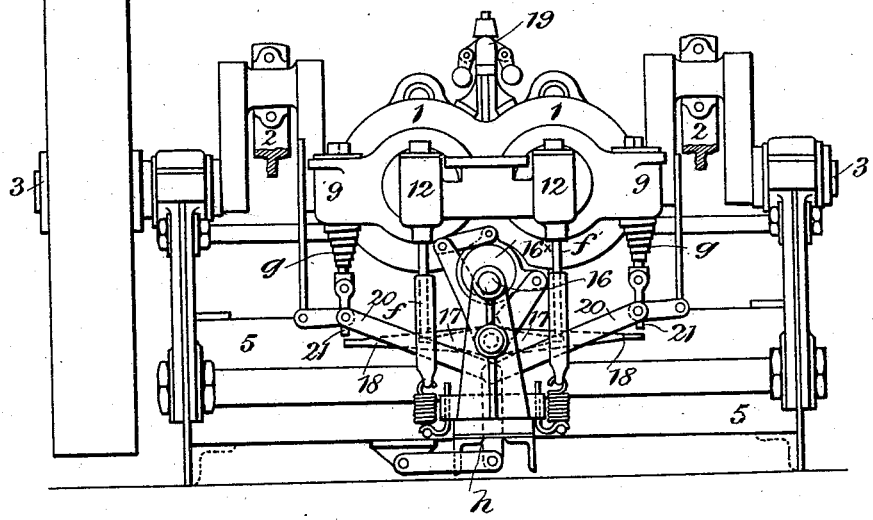
Figure 4:
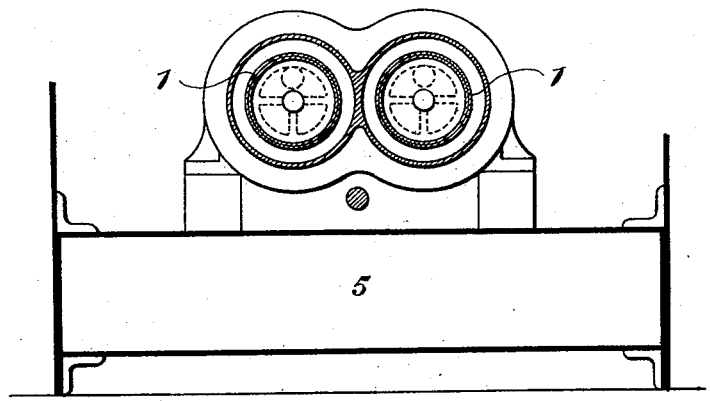

In the accompanying drawings, Figure 1 is a side elevation, partly in section. Fig. 2 is a plan. Fig. 3 is an end elevation, and Fig. 4 is a transverse section on the line C D of Fig. 2. Figs. 5 to 14 are detail views. These figures show a four-cylinder engine constructed in accordance with our invention.

The four cylinders 1 1 1 1 are water-jacketed and are similar in construction the one to the other. The pistons P are all connected by their piston-rods $p'$ to one cross-head $a$, which is mounted to slide in suitable guides $a'$. The cross-head $a$ is connected by pitmen 2 2 to a crank-shaft 3, mounted in suitable bearings in the frame and carrying a fly-wheel $b$. The cylinders are worked according to the Otto cycle and at any instant the cycle is in different phase in each cylinder. Thus during each revolution the crank receives two impulses—one in each direction. The explosive charge is introduced and the products of combustion are ejected at the outer end of each cylinder.

Figs. 5, 6, and 7 show to a larger scale the cylinder-cover, in which the passages for the introduction of the charge and the ejection of the spent gases are located. Fig. 5 is a longitudinal section of the cover, Fig. 6 a transverse section on the line A B in Fig. 7, and Fig. 7 is a plan. The charge of petroleum or like fuel is introduced at 4 by means hereinafter described, and it meets air drawn from one or other of the compressed-air reservoirs 5, located beneath the cylinders and extending transversely across the machine. Air passes from the reservoirs through valves 6 (indicated in Fig. 1 and shown on a larger scale in Fig. 8) and enters by the passages $6^\times$ into the annular passages 7 in the cylinder-covers. In each cover the air meets the charge of petroleum and the two pass together into the other annular passage 8, which leads them to the under side of the admission-valve 9, as shown in Fig. 5. After passing the admission-valve the charge reaches the cavity $10^\times$ in the cast-iron button 10, and issues by a series of perforations, as seen in Fig. $5^\times$, into the chamber 11. At the outer end of this chamber the exhaust-valve 12 is situated, and this being closed at the time that the charge is injected the charge passes through the central passage of the button 10 into the cylinder. As the piston moves along the cylinder it sucks in the charge until the admission-valve closes and then the piston passes over the port 13 in the side of the cylinder and allows compressed air, which is stored in the reservoir 5, to enter the cylinder until the pressure in the capacity which contains the charge is nearly the same as that in the compressed-air reservoir. On the return of the piston the charge, which already is at a pressure above atmospheric, is further compressed, and then the heat in the walls of the combustion-chamber, and especially in the button 10, is sufficient to ignite the charge. The piston is now driven toward the inner end of the cylinder, performing work upon the crank. During this inward stroke the piston again passes over the port 13, placing the outer end of the cylinder in communication with the air-reservoir 5. The exhaust-valve 12 now opens and air passes from the reservoir into the cylinder and drives out the products of combustion, the expulsion of which is completed by the return of the piston. During the movements of the pistons air is compressed by them into the reservoirs 5 5.

The inner ends of each pair of cylinders are connected by pipes $d$ with a suction-valve 14, the details of which are shown in Fig. 9. As the pistons travel outward air enters through these valves into the cylinders. On the return of the pistons this air is compressed and it enters the reservoir by the port 13.

The feed and exhaust valves are actuated in the following manner: A skew-wheel 15 upon the crank-shaft 3, engaging with another skew-wheel e, drives the horizontal longitudinal shaft 16, which revolves at one-half the speed of the crank-shaft. The shaft 16 has upon it an eccentric 16$^\times$ (see Fig. 3) at each end, which, by connections, as shown, imparts a rocking movement to the lever 17, the ends of which alternately lift the spindles $f$ of the exhaust-valves 12, which are of ordinary construction. The same eccentric also actuates another rocking lever 18, which in a similar manner opens the admission-valves 9 9, which are normally held closed by springs $g$. The admission-valves are, however, further controlled by a governor 19, and when the balls of the governor rise they, by a suitable connection, (indicated at $h$,) lift the inner ends of the toggle-levers 20 20. These toggle-levers are jointed to pushers 21 21, which are jointed prolongations of the stems of the admission-valves 9. The pushers are thus thrown into an inclined position, such that they are out of the reach of the rocking lever 18. So long as the speed remains excessive the lever 18 misses the pushers 21, and no charge is admitted to the cylinders.

Figure 10:
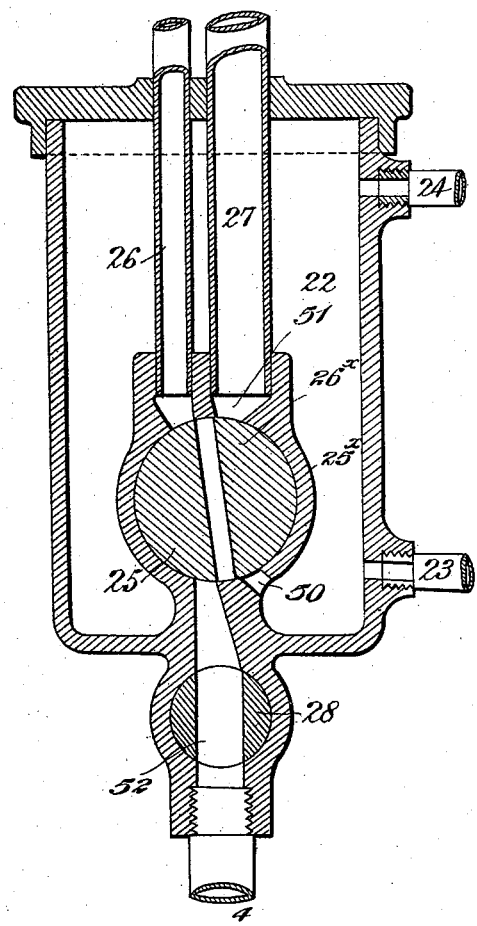
Figure 11:
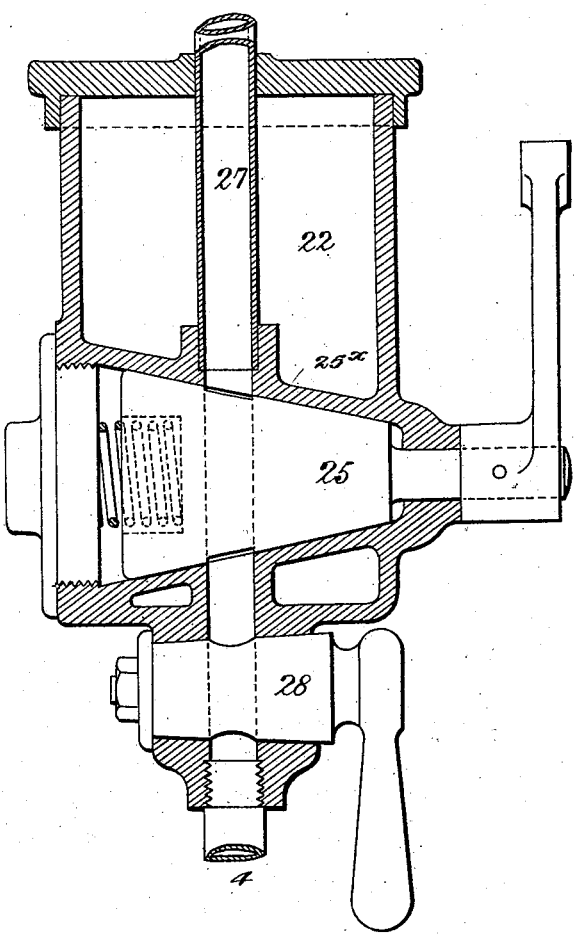
Figure 12:
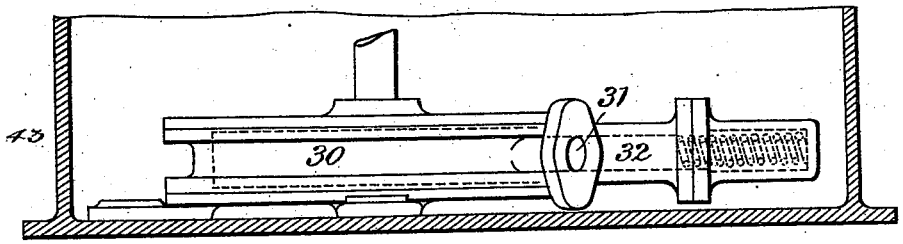
Figure 13:
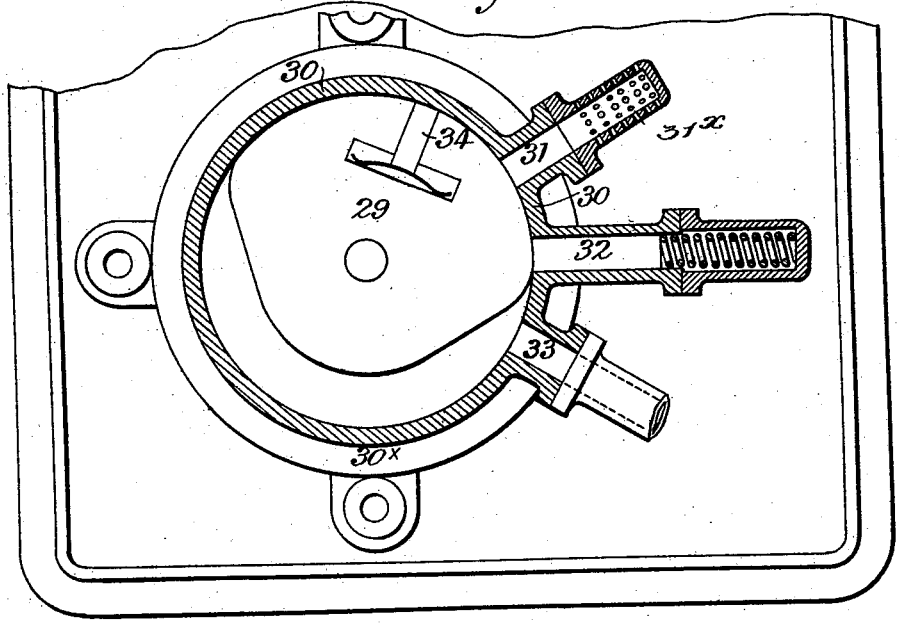

Figs. 10 and 11 show the apparatus by which the petroleum is measured out in suitable quantities before it enters the engine through the pipes 4. 22 is a reservoir to which the petroleum is admitted continuously by a pipe 23 from a rotary pump, such as is shown by Figs. 12 and 13. 24 is an overflow-pipe by which any excess of the oil returns to the tank in which the pump is situate. 25 is a conical measuring-plug. It fits into a corresponding shell 25$^\times$, and has a passage 26$^\times$ through it of a capacity to hold the required charge of petroleum. 26 is a vent-pipe open at the upper end to the atmosphere, and 27 is a pipe communicating with a small resvervoir, (not shown,) into which air is forced by a pump. The plug 25 receives motion through a small arc by connection with any moving part of the engine. This movement brings the passage 26$^\times$ in the plug to correspond with a port 50, by which the petroleum enters and fills the passage and may fill up a certain distance into the vent-pipe 26. Then another movement of the plug brings the passage 26$^\times$ through it to correspond with ports 51 52, and by the compressed air from the pipe 27 the charge of petroleum in the passage 26$^\times$ is blown out through the port 26 and through the pipe 4 into the engine, as before explained. 28 is an ordinary stop-cock to shut off the supply of oil when the engine is out of use.

The action of the rotary pump shown by Figs. 12 and 13 will be readily understood. The pump is arranged in a tank 53, containing the hydrocarbon liquid. 29 is a revolving block which is fitted into the cylindrical chamber 30. On one side of the block and between it and the cylinder is a cavity 30$^\times$. The petroleum enters this cavity at 31 through a strainer 31$^\times$ when the block is in a suitable position and fills the cavity. The spring-slide 32, resting against the edge of the block, prevents the charge in the cavity from being carried around with the block, and the charge is delivered through the pipe 33, through which pipe it connects with the port 23 in the measuring apparatus. (Shown in Fig. 10.) It will thus be understood that the petroleum is taken from a tank, supplied to a measuring apparatus, which in turn supplies it in regulated quantities to the engine. 34 is a packing-piece in the block 29.

The apparatus may be somewhat modified without departing from our invention. As a substitute for the ports 13 in the sides of the cylinders 11, valves 35 may be provided on the pistons P. These valves open toward the outer ends of the cylinders and are arranged to allow the compressed air to pass from the reservoir 5 into the working end of the cylinders whenever the pressure in the reservoir sufficiently preponderates.

Chamber 36 may be provided in connection with the annular passage 8 to store a small quantity of combustible vapor to supply a burner, if required. A passage 8$^\times$ for connecting the passage 8 with the chamber 36 is shown in Fig. 6. The ignition on starting the engine may be provided for by fitting into the side of the combustion-chamber a metal tube 37, closed at its outer end. This tube, when required, is heated red hot by the flame of a lamp, which, after the engine is started, is no longer required.

Figure 14:
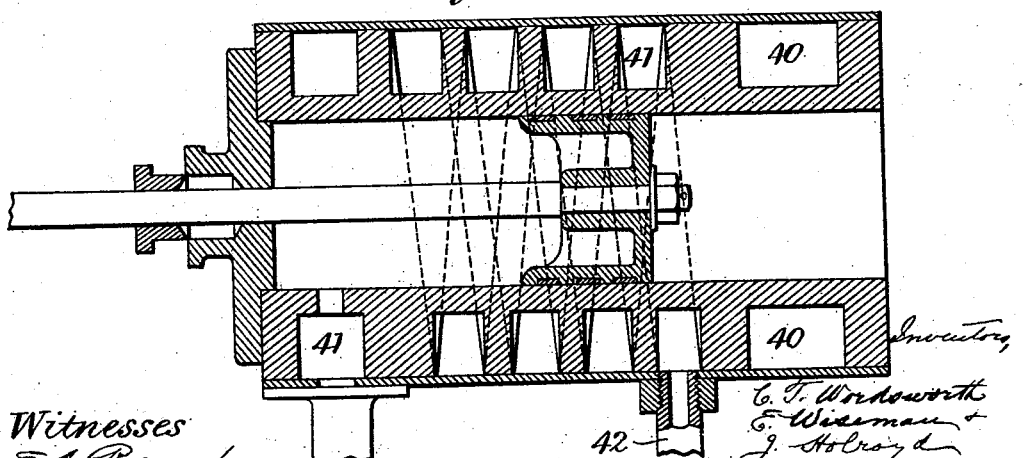

Instead of water-jacketing the cylinders throughout their entire length the water-jacket may be confined to the hotter end of the cylinder, and the rest of the length of the cylinder may be enveloped by a spiral passage in which the air circulates before it reaches the compressed-air reservoir. This arrangement is shown by Fig. 14, which is a section of one of the cylinders to a larger scale. 40 is a water-jacket, and 41 a spiral air-passage which the air enters by the pipe 42, being drawn in by the pistons past a valve, such as shown at Fig. 9. The air passes through the spiral passage, cools the cylinder, and then it reaches the reservoir 5 and the inner ends of the cylinder.

What we claim is—

1. The combination of a cylinder, its piston, the air-reservoir, a port in the side of the cylinder connecting with a passage leading to the reservoir, an air-admission valve in the cylinder, and means for reciprocating the piston to compress air into the reservoir and to uncover the port in the side of the cylinder thereby permitting the compressed air to enter and mingle with the charge in the cylinder and thus increase the density of the charge, substantially as described.

2. In a hydrocarbon-motor the combination of the working cylinder, the inlet-valve, means for operating it, the piston and means for admitting air under pressure to the working cylinder immediately after the charge of hydrocarbon vapor has been drawn into the cylinder and the inlet-valve is closed.

3. The feeding appliance for hydrocarbon-motors, consisting of the combination of a vessel kept constantly full of the liquid fuel, a plug with a measuring-passage of suitable capacity formed in it, a shell containing the plug and provided with ports communicating respectively with the interior of the vessel, an open vent-tube, a pipe supplying air under pressure, and a pipe which delivers the charge to the cylinder of the engine.

4. In a hydrocarbon-motor the combination of the cylinder, a heated chamber at one end thereof through which the heated products of combustion are discharged, passages for air and vapor disposed around the heated chamber, a partition between the cylinder and the heated chamber having numerous openings connecting the heated chamber with the surrounding passages and a central opening which serves both to admit the charge to the cylinder and for the discharge of the products of combustion therefrom, admission and exhaust valves, and means for operating them.

CHRISTOPHER THOMAS WORDSWORTH.
EDMUND WISEMAN.
JOHN HOLROYD.

Witnesses:
ROBERT B. RANSFORD,
FRED C. HARRIS.